United States Patent
Kato

(10) Patent No.: US 6,447,406 B1
(45) Date of Patent: *Sep. 10, 2002

(54) GOLF BALL MOLD AND GOLF BALL

(75) Inventor: Tamotsu Kato, Saitama (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,445

(22) Filed: Feb. 9, 2000

(30) Foreign Application Priority Data

Feb. 9, 1999 (JP) .......................... 11-030759

(51) Int. Cl.$^7$ .................. A63B 37/00; A23G 3/12; A23G 3/16; A23P 1/00; B21C 3/00
(52) U.S. Cl. ...................... 473/351; 425/127
(58) Field of Search .................. 473/379, 378; 264/278; 249/91; 425/127, 129.1, 468, 556, 577, DIG. 58

(56) References Cited

U.S. PATENT DOCUMENTS

| 5,122,046 A | * | 6/1992 | Lavallee et al. | ............ 264/278 |
| 5,458,473 A | | 10/1995 | Banji | ......................... 425/116 |
| 5,688,193 A | * | 11/1997 | Kassasima et al. | ......... 473/379 |
| 5,882,567 A | * | 3/1999 | Cavallaro et al. | ........... 264/255 |
| 5,947,844 A | * | 9/1999 | Shimosaka et al. | ......... 473/379 |
| 5,975,869 A | * | 11/1999 | Shimosaka et al. | ......... 425/116 |

OTHER PUBLICATIONS

Merriam–Webster's Collegiate Dictionary (www.m–w.com).*

* cited by examiner

Primary Examiner—Paul T. Sewell
Assistant Examiner—Alvin A. Hunter, Jr.
(74) Attorney, Agent, or Firm—Sughrue Mion, PLLC

(57) ABSTRACT

A golf ball mold including a spherical cavity having a large number of projections for shaping dimples on the inner wall surface with a parting surface provided at a position substantially corresponding to an equator of the cavity, provided with a plurality of core support pins elongating reciprocally movably on a circle centering on each pole of the cavity of the upper mold or the lower mold with a predetermined radius with a predetermined distance with each other in the cavity in the direction perpendicular to the parting surface. In the golf ball mold, the support pins have a dimple shaping projection at the tip portion thereof having a round shape on the cavity wall surface level, protruding from the position to the cavity center direction when the support pins are withdrawn to the cavity wall surface position.

5 Claims, 3 Drawing Sheets

GOLF BALL MOLD AND GOLF BALL

BACKGROUND OF THE INVENTION

1. Field of the Invention

The present invention relates to a mold for shaping a golf ball with excellent symmetry, and a ball shaped by the mold.

2. Description of the Related Art

As golf balls, a rubber thread type produced by covering a core formed by spherically winding a rubber thread with a balata cover, and a solid type produced by covering a rubber spherical core with a resin cover are commonly known. Among them, the solid type is prevailing among golfers.

How a solid golf ball is shaped will be described with reference to a cross-sectional view of a mold shown in FIG. 4.

In FIG. 4, a mold 1 comprises an upper mold 2 and a lower mold 3 to be parted at a parting surface P, with a spherical cavity 4 formed therein. The cavity 4 has a large number of projections (not illustrated) with a circular shape when viewed two-dimensionally on an inner wall surface 5 for forming dimples. The parting surface P is provided at a position corresponding to an equator of the spherical cavity 4. In the figure, the cavity 4 accommodates an elastic core 12 in the center thereof, and the elastic core 12 is supported by a plurality of support pins 6 from above and below. A projection for forming a dimple which is the same or similar to at least one dimple one provided on the cavity wall surface 5 is provided on the tip portion of each support pin.

Reference numeral 7 denotes a runner provided along the circumference of the cavity 4. A thermoplastic resin for the covering material is pressed into the space between the core 12 and the inner wall surface 5 through a plurality of (4 to 12) gates elongating from the runner. Immediately before the covering material is cured, the support pins 6 are withdrawn to the level of the cavity inner wall surface 5 so that the covering material is shaped thereafter by cooling. At that time, the dimples at the positions of the support pins 6 are formed by the tip portions thereof. Reference numeral 9 denotes a degassing means for discharging a gas existing or generated in the cavity at the time of shaping.

Incidentally, a plurality (in general three to four pieces) of support pins are perpendicular to the parting surface P of the mold and provided on the circumference with a 7 to 9 mm radius, centering on a line j linking both poles of the cavity. With the support pins disposed accordingly with respect to the mold, the cross-section of the support pins 6 in the direction perpendicular to the axial direction thereof is a round shape with a diameter x in the direction of the central axis j linking both poles of the cavity and a diameter y in the direction perpendicular thereto equally provided as shown in FIG. 5. However, the cross-section in the direction of the normal of the wall surface in the cavity is an elliptic shape with the diameters x' and y' corresponding to the diameters x and y mentioned above provided so that x'>y' as shown in FIG. 6.

Apparently, the dimples shaped by the elliptic projections at the support pin tip portions are elliptic dimples different from the round dimples formed in the other area.

A golf ball having both round and elliptic dimples is poor in terms of not only the external appearance but also the flying symmetry according to the rotational direction of the hit ball.

SUMMARY OF THE INVENTION

In order to solve the above-mentioned problem, an object of the invention is to provide a golf ball mold capable of shaping the same dimples at the positions of support pins as in the other portions, and a golf ball shaped by the mold.

In order to achieve the above object, the invention provides a golf ball mold comprising: an upper mold and a lower mold for forming a spherical cavity having a large number of projections for shaping dimples on an inner wall surface thereof with a parting surface provided at a position substantially corresponding to an equator of the cavity; and a plurality of core support pins elongating reciprocally movably in a direction perpendicular to the parting surface on a circle centering on each pole of the cavity of the upper mold and the lower mold with a predetermined radius with a distance with each other in the cavity, wherein the support pins have a dimple shaping projection at a tip portion thereof having a round shape on a cavity wall surface level, protruding from the position to a cavity center direction when the support pins are withdrawn to a cavity wall surface position.

Further, the invention provides a golf ball shaped by the above-mentioned golf ball mold.

It is preferable that the support pins of the mold have an elliptic cross-sectional shape in the direction perpendicular to the central axis thereof with the minor axis disposed in the direction of the axial line linking both poles of the cavity.

Moreover, it is preferable that the support pins centering each pole of the cavity are disposed at 3 to 5 positions on a circle with a 6 to 10 mm radius centering on the axis linking both poles of the cavity with an equal interval.

Furthermore, it is preferable that the tip portion projections of the support pins to be disposed on the circle have the same size. However, a plurality of pairs of projections with different projection sizes can be used with the ones with the same size disposed at positions with a 180° angle with each other. Moreover, ones with different projection sizes can be used in a combination as long as the object of the invention is achieved.

DETAILED DESCRIPTION OF THE PREFERRED EMBODIMENT

Hereinafter, the invention will be described with reference to the drawings.

Figure 1:
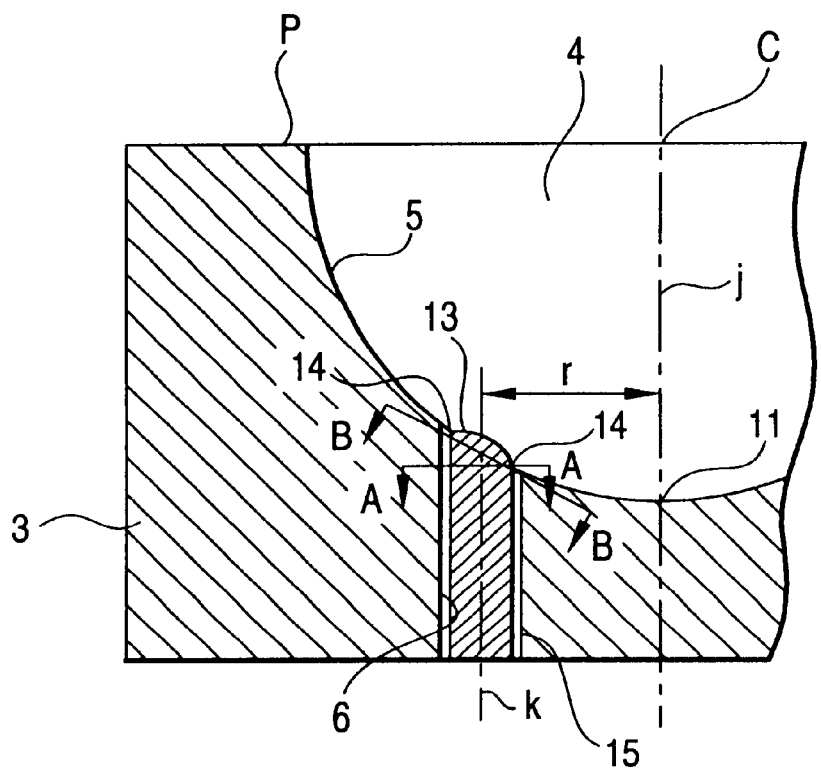
FIG. 1 is a partial cross-sectional view of a golf ball mold according to an embodiment of the invention.
Figure 2:
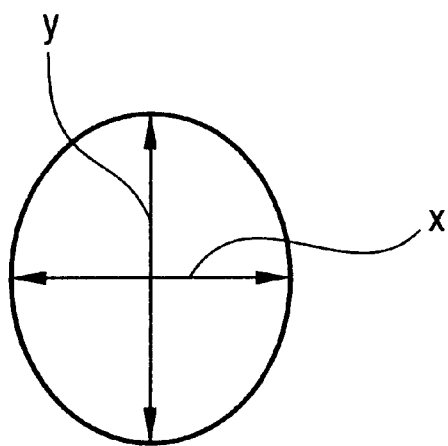
FIG. 2 is a cross-sectional view of a core support pin taken on the line A—A of FIG. 1.
Figure 3:
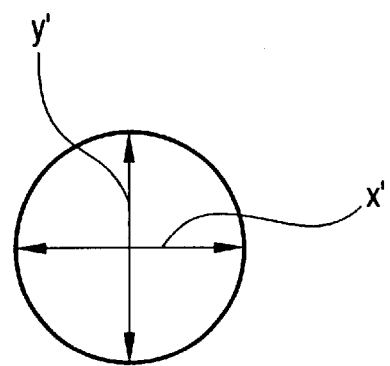
FIG. 3 is a cross-sectional view of the core support pin taken on the line B—B of FIG. 1.

FIG. 1 is a partial cross-sectional view of the vicinity of a pin of a golf ball mold according to an embodiment of the invention, FIG. 2 is a cross-sectional view of the pin portion taken on the line A—A of FIG. 1, and FIG. 3 is a cross-sectional view of the same taken on the line B—B of FIG. 1.

Figure 4:
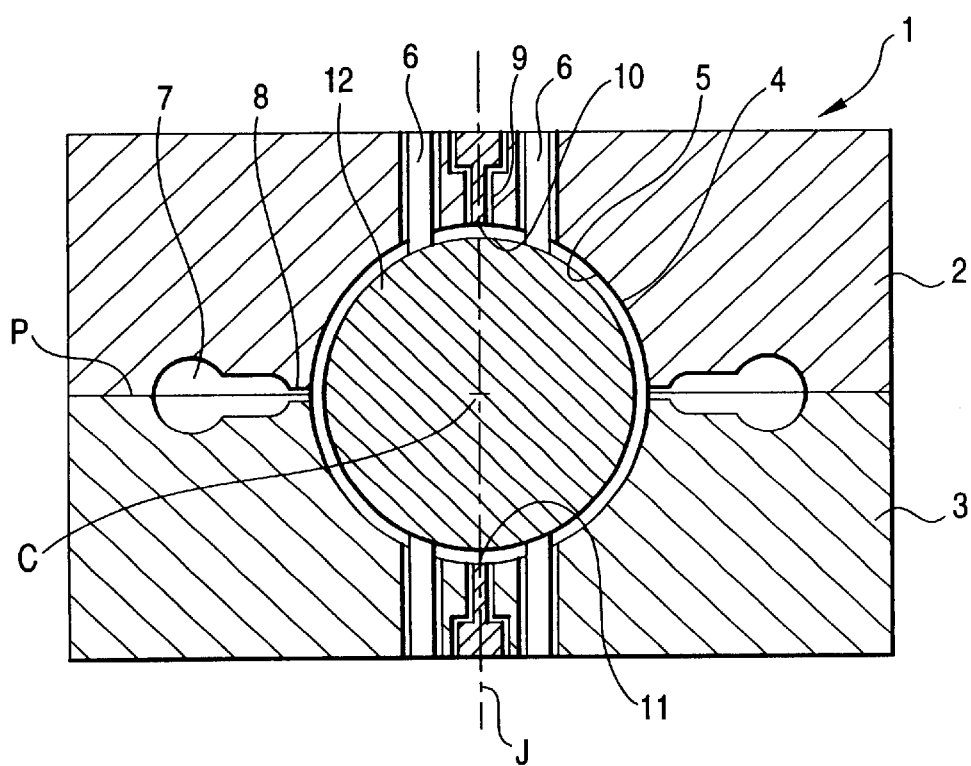
FIG. 4 is a cross-sectional view of a conventional golf ball mold.
Figure 5:
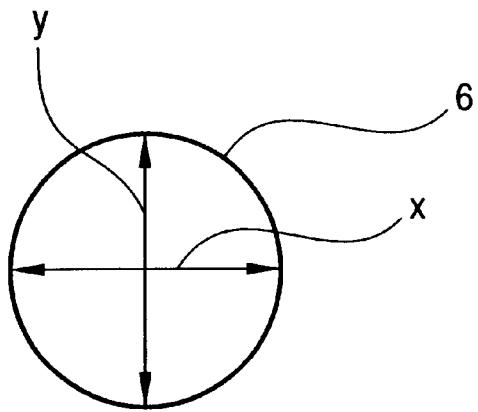
FIG. 5 is a cross-sectional view of a core support pin tip portion of FIG. 4 in the direction perpendicular to the pin axis.
Figure 6:
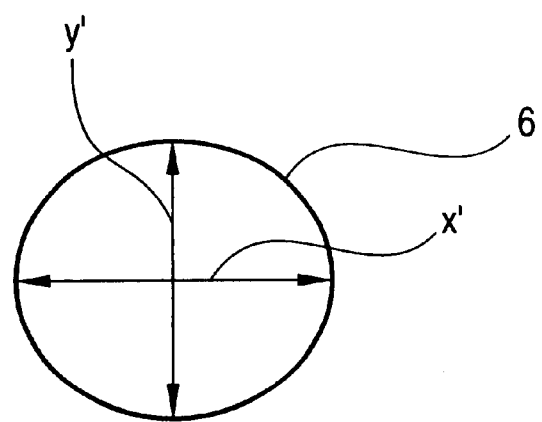
FIG. 6 is a cross-sectional view of the core support pin tip portion of FIG. 4 in the cavity inner wall surface normal direction.

In the invention, a mold with the conventional structure described with reference to FIG. 4 can be used except the portions shown in FIGS. 1 to 3.

Although FIG. 1 shows only the left side portion of the lower mold 3, the right and left sides of the mold are symmetrical, and the upper mold has the substantially same structure.

In FIG. 1, three pieces-of core support pins 6 are disposed on a circle of a radius r centering the axis j linking both poles 11 of the cavity with a 120° interval in the direction perpendicular to the parting surface P.

A projection 13 is formed on the tip portion of the support pins for shaping a dimple. The cross-section of the support pin 6 taken on the line A—A, parallel with the parting surface P is an elliptic shape formed by a shorter diameter x in the direction of the cavity center axis j and a longer diameter y perpendicular thereto. A pin hole 15 accommodating the support pin also has the same elliptic cross-section.

On the other hand, in the case the support pin 6 is at a withdrawn position as shown in FIG. 1, the cross-section in the tangent direction of the cavity inner wall surface 5, that is, the B—B cross-section (FIG. 3) on the periphery 14, 14 (corresponding to the position at which the periphery portion of the dimple intersects with the land portion on the ball) of the base portion of the pin projection 13 which intersects with the arc of the cavity inner wall surface (for shaping the ball land portion) has the diameters x' and y', which correspond to the shorter diameter x and the longer diameter y in FIG. 2, of a substantially same size. Therefore, the projection 13 has a round shape when viewed two-dimensionally from the direction of the cavity center C.

In the invention, a core support pin 6 having a polygonal cross-section can also be used as long as the object can be achieved. In this case, x' and y' of the outline linking the vertices of the polygon should be substantially same.

In the invention, the diameter x' or y' of the tip portion projection 13 of the support pin shown in FIG. 3 can be in the range of 2 to 5 mm similar to the diameter of the other projections provided on the inner wall surface 5.

Since dimples shaped by the tip portions of the core support pins are the same as the other dimples shaped by the projections provided on the cavity inner wall surface in a golf ball shaped by the above-mentioned mold, the uniformity of the shaped ball can be improved remarkably.

As described above, a golf ball mold according to the invention can shape a golf ball with the excellent uniformity in dimple shaping, and thus a golf ball shaped by the mold provides not only an improved external appearance but also an advantageously improved flying symmetry regardless of the rotational direction of the hit ball.

What is claimed is:

1. A golf ball mold comprising:
   an upper mold and a lower mold for forming a spherical cavity having a large number of projections for shaping dimples on an inner wall surface thereof with a parting surface provided at a position substantially corresponding to an equator of the cavity; and
   a plurality of core support pins elongating reciprocally movably in a direction perpendicular to the parting surface on a circle centering on each pole of the cavity of the upper mold and the lower mold with a predetermined radius with a distance with each other in the cavity,
   wherein the support pins have a dimple shaping projection at a tip portion thereof having a round shape on a cavity wall surface level, protruding from the position to a cavity center direction when the support pins are withdrawn to a cavity wall surface position and wherein the support pins have an elliptic cross-sectional shape in a direction perpendicular to a central axis thereof with a shorter diameter disposed in a direction toward an axial line linking both poles of the cavity.

2. The golf ball mold in claim 1, wherein the shorter diameter is in the range of 2 to 5 mm.

3. The golf ball mold in claim 1, wherein the elliptic cross-sectional shape of the support pins have a longer diameter perpendicular to and larger than said shorter diameter, and which is in the range of 2 to 5 mm.

4. A golf ball shaped by the golf ball mold according to claim 1.

5. A golf ball mold comprising:
   an upper mold and a lower mold for forming a spherical cavity having a large number of projections for shaping dimples on an inner wall surface thereof with a parting surface provided at a position substantially corresponding to an equator of the cavity; and
   a plurality of core support pins elongating reciprocally movably in a direction perpendicular to the parting surface on a circle centering on each pole of the cavity of the upper mold and the lower mold with a predetermined radius with a distance with each other in the cavity,
   wherein the support pins have a dimple shaping projection at a tip portion thereof having a round peripheral shape on a cavity wall surface level which is defined by the shape of the cross-section in a tangent direction of the cavity inner wall surface, protruding from the position to a cavity center direction when the support pins are withdrawn to a cavity wall surface position and wherein the support pins have an elliptic cross-sectional shape in a direction perpendicular to a central axis thereof with a shorter diameter disposed in a direction toward an axial line linking axial line linking both poles of the cavity.

* * * * *